Oct. 28, 1958  O. F. COUCHOT  2,858,080
FEED CONTROL FOR MULCH SPREADER
Filed Oct. 29, 1956  2 Sheets-Sheet 1

INVENTOR
O. F. Couchot
BY John K. Randolph
ATTORNEY

Oct. 28, 1958     O. F. COUCHOT     2,858,080
FEED CONTROL FOR MULCH SPREADER
Filed Oct. 29, 1956     2 Sheets-Sheet 2
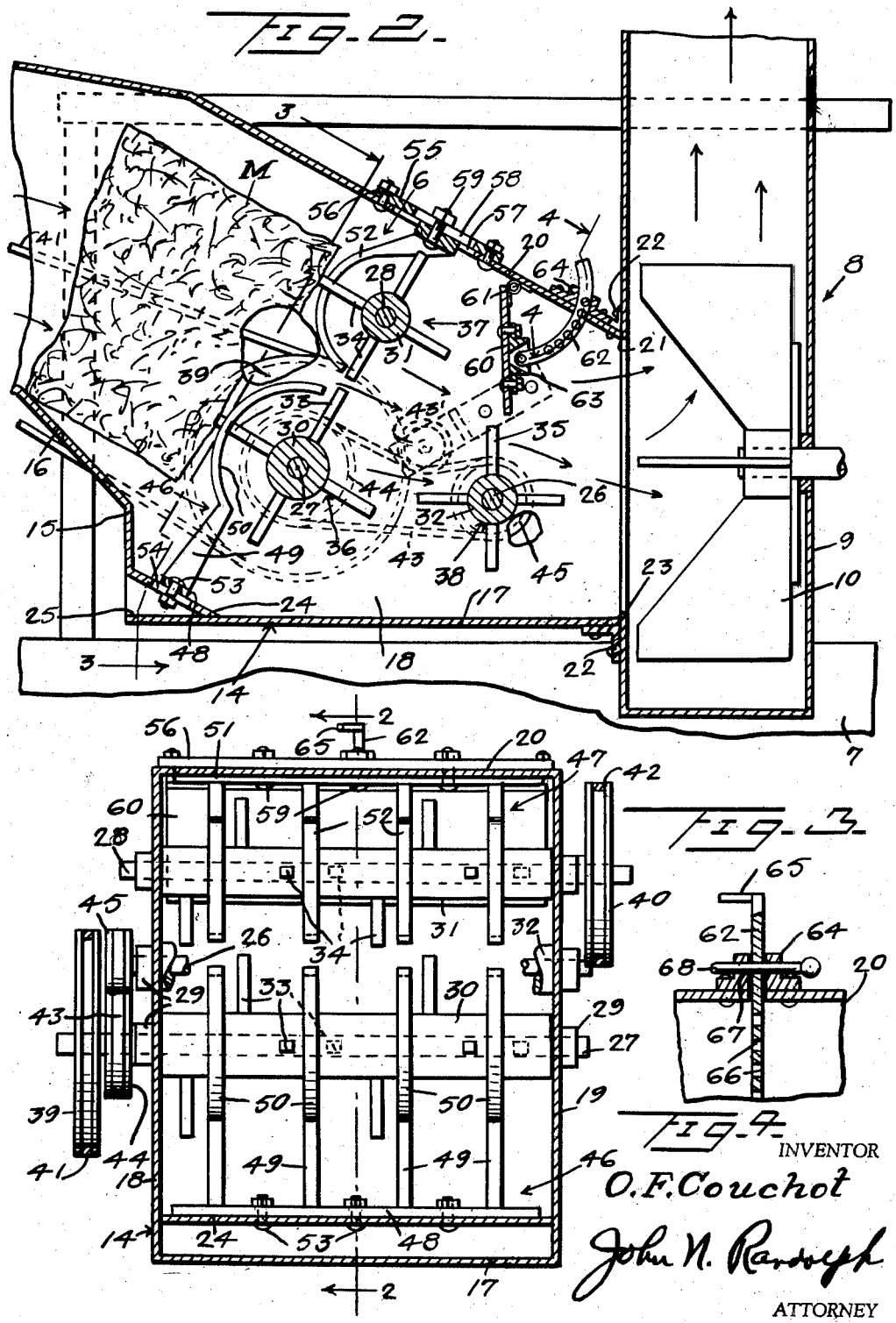
INVENTOR
O. F. Couchot
John N. Randolph
ATTORNEY

United States Patent Office

2,858,080
Patented Oct. 28, 1958

2,858,080

FEED CONTROL FOR MULCH SPREADER

Orville F. Couchot, Sidney, Ohio

Application October 29, 1956, Serial No. 618,806

6 Claims. (Cl. 241—138)

This invention relates to a novel feed control primarily adapted for use with a mulch spreader, and has for its primary object to provide an adjustable feed control by means of which the amount of the mulch material passing therethrough to a blower can be varied to best suit the terrain onto which the mulch is to be spread, so that the mulch will not be spread too thin or too thick.

A further object of the invention is to provide a feed control which can be adjusted for feeding either loose or baled mulch material and which will effectively separate and finely divide the material where applied to the feed control in baled or packed form.

Still a further object of the invention is to provide a feed control which can be adjusted for handling either wet material in the form of long strands or dry material in the form of short strands, constituting the two extremes of feed conditions of the mulch, and so that either of the two extreme types of mulch can be discharged substantially uniformly.

A further object of the invention is to provide a feed control which will effectively function to separate long and wet strands of mulch to prevent discharge of such mulch by a blower in the form of large clumps and bunches and which would result in an uneven distribution and would kill the growth on a terrain onto which the clumps were discharged.

Still a further object of the invention is to provide a feed control which will accomplish a uniform supply of mulch material to a blower and even uniform discharge of material therefrom so that a surface may be uniformly covered by the material to a proper thickness or density to obtain maximum benefit from the mulch.

Various other objects and advantages of the invention will hereinafter become more fully apparent from the following description of the drawings, illustrating a presently preferred embodiment thereof, and wherein:

Figure 2 is an enlarged longitudinal sectional view of the feed control, taken substantially along a plane as indicated by the line 2—2 of Figure 3;

Figure 3 is a cross sectional view of the feed control, taken substantially along a plane as indicated by the line 3—3 of Figure 2, and Figure 4 is an enlarged fragmentary transverse sectional view, taken substantially along a plane as indicated by the line 4—4 of Figure 2.

Figure 1:
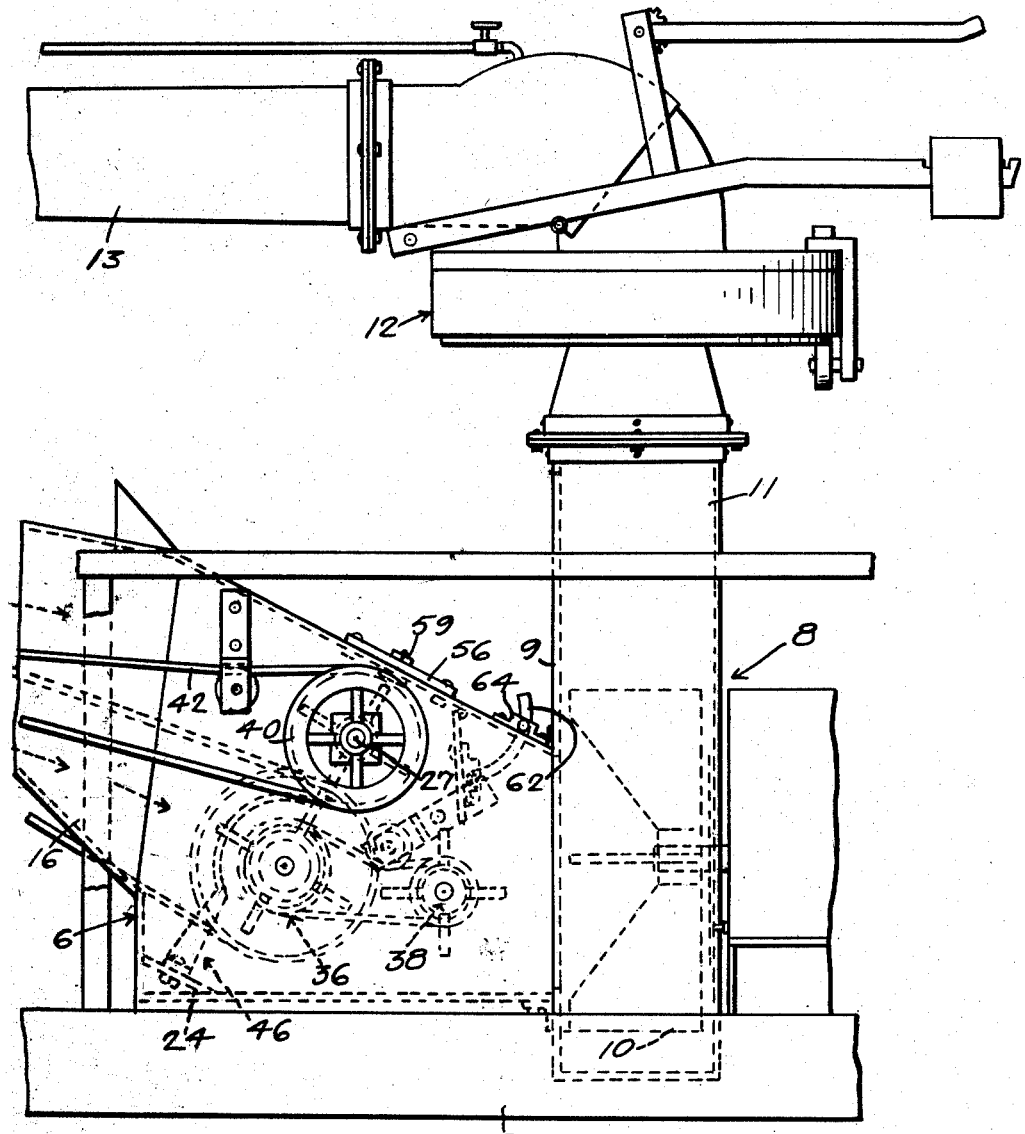
Figure 1 is a fragmentary side elevational view of a mulch spreading machine including a feed control thereof.

Referring more specifically to the drawings, for the purpose of providing a full disclosure of the operation as well as the construction of the feed control, designated generally 6 and comprising the invention, a portion of a mulch spreading machine has been illustrated in the drawings, including a part of the machine frame or chassis 7, which is adapted to be supported by wheels or other ground engaging means, not shown, to form a mobile support for the feed control 6 and other parts mounted thereon and which includes a blower 8. The blower 8 includes a casing 9 and an impeller or fan 10 which is mounted therein and which is suitably driven. The blower casing 9 includes an upwardly extending outlet conduit 11 to the upper outlet end of which is connected one end of a swivel elbow 12 which has an opposite outlet end to which is coupled one end of a discharge tube or nozzle 13, which tube or nozzle 13 may be of considerable length. The swivel elbow 12 is fully disclosed in my copending application Serial No. 618,781, filed October 29, 1956 and entitled Swivel Elbow.

The feed control 6 includes a casing 14 an open inlet end 15 of which constitutes an integral extension of a supply conduit the outlet end portion 16 of which is shown. The supply conduit 16 is inclined downwardly and toward the feed control casing 14 so that material M in moving into the blower 8 must pass through the feed control 6.

The feed control casing 14 includes a substantially flat bottom 17, spaced substantially parallel side walls 18 and 19, as best seen in Figure 3, and a top wall 20 which forms a downwardly inclined extension of the top wall of the outlet end 16 of the supply conduit. The feed control casing 14 has a restricted open outlet end 21 and which is secured in any suitable manner as by means of brackets 22 to a wall of the blower casing 9, around an inlet opening 23 thereof. The casing 14 also includes an inclined rear bottom portion 24 which extends upwardly and rearwardly from the casing bottom 17 and which combines with an end thereof, disposed remote from the blower 8, to define an opening 25, which does not communicate with the interior of the feed control casing 14 but which affords access to the space between the inclined bottom wall portion 24 and the part of the bottom 17, located therebeneath, for a purpose which will hereinafter become apparent.

Three shafts 26, 27 and 28 extend transversely across the casing 14, through openings in the side walls 18 and 19 and are each journaled in a pair of bearings 29. The bearings 29 for the three shafts are mounted on the outer sides of the walls 18 and 19, as seen in Figure 3. Drums 30, 31 and 32 are disposed on and fixed to the shafts 27, 28 and 26, respectively, and are contained within the casing 14. The drum 30 has eight straight tines or spikes 33 fixed thereto and projecting radially therefrom and which are disposed in longitudinally and circumferentially spaced relation to one another, as seen in Figures 2 and 3. The drum 31 likewise has eight longitudinally and circumferentially spaced tines or spikes 34 fixed thereto and projecting radially therefrom, and the drum 32 has sixteen circumferentially and longitudinally spaced tines or spikes 35 which project radially therefrom. The shaft 27, the drum 30 and tines 33 form the lower revolving feeder and material separator 36, and the shaft 28, drum 31 and tines 34 form the upper material feeder and separator 37 and which is disposed above and at an incline toward the blower 8, relative to the feeder member 36. The drum 32, shaft 26 and tines 35 are disposed between the feeder member 36 and the feed control outlet 21 and form a beater and separator 38.

Relatively large drive pulleys 39 and 40 are fixed to opposite ends of the shafts 27 and 28, respectively, externally of the casing 14, as best seen in Figure 3. Endless belts 41 and 42 are trained over the pulleys 39 and 40, respectively, and are driven from a suitable power source, not shown. An endless belt 43 is trained over a smaller pulley 44 fixed to the shaft 27, and a pulley 45 which is fixed to the shaft 26 and which is of a smaller diameter than the pulley 44 so that the beater 38 will revolve at a faster speed than the revolving feeder 36. A belt tightener 43', which is supported by the casing wall 18, includes a pulley which bears on the upper flight of the belt 43 to maintain said belt properly tensioned. The pulleys 39 and 40 are also of different diameters so that the rotary feeder 36 will be driven somewhat slower than the upper rotary feeder 37 while the beater and separator 38 will be driven at a faster R. P. M. than the upper feeder 37. Additionally, the lower feeder 36 is of a larger diameter than the upper feeder 37 and the beater 38 is preferably of a diameter substantially corresponding to that of said upper feeder.

The feed control 6 also includes a lower feed regulator 46 and an upper feed regulator 47. The feed regulator 46 includes a base bar 48 from one side of which projects four spaced fingers 49 having arcuately curved free ends 50. The feed regulator 47 includes a base bar 51, from one side of which project four arcuately curved fingers 52, the length and curvature of which is less than the length and curvature of the fingers 49. The bar 48 of the lower regulator 46 rests on the inner or upper side of the inclined bottom wall portion 24 and is secured thereto by nut and bolt fastenings 53 which extend through slots 54 of said bottom 24. The feed regulator 46 is disposed between the casing inlet 15 and the drum 30 and may be adjusted by means of the engagement of the fastenings 53 with the slots 54 to vary the spacing between the curved finger portions 50 and said drum 30. The tines or spikes 33 project between said fingers 49 to beyond the curved plane of the convex sides thereof, as seen in Figure 2, and the feed regulator 46 is adjusted to vary the extent that the spike tips will protrude past the curved finger portions 50 toward the inlet 15. It will be understood that the fastenings 53 are tightened to secure the lower feed regulator 46 in a desired adjusted position relative to the lower rotary feeder 36. A plate 55 is secured by fastenings 56 over a relatively large opening 57 in the top wall 20. Said plate 55 has slots 58 to accommodate nut and bolt fastenings 59 which extend through the base bar 51 to adjustably secure the upper regulator 47 thereto and so that the fingers 52 thereof may be similarly adjusted relative to the spikes or tines 34 of the upper rotary feeder 37. The free ends of the tines 49 and 52 are disposed in spaced apart relatively close relationship to one another, as seen in Figures 2 and 3.

A baffle plate 60 extends substantially across the feed control casing 14 above the beater 38 and has an upper edge connected by a hinge 61 to the top wall 20 for swinging movement of the baffle 60 longitudinally of the casing 14. One end of a curved arm 62 is pivotally connected as seen at 63 to a side of the baffle 60 which normally faces toward the outlet 21. Said curved arm 62 extends upwardly from the baffle 60 slidably through the top wall 20 and through a boss 64 which is secured to the outer side thereof. The arm 62 has a laterally turned upper end 65 forming a handle and which is disposed above the boss 64, as best seen in Figure 4. The arm 62 is provided with longitudinally spaced openings 66 which may be selectively aligned with a bore 67 of the boss 64 to receive a pin 68 for varying the position of the baffle 60 relative to the beater 38. The baffle 60 is shown in Figure 2 in a fully lowered position with its bottom edge disposed adjacent the periphery of the beater 38, and may be adjusted to a substantially inoperative position fully raised and beneath and substantially parallel to the top wall 20.

The material M (Fig. 2), to be used as mulch, may be supplied to the casing inlet 15 by a suitable power conveyor, not shown, but is preferably supplied by gravity down the inclined supply conduit and by suction from the impeller 10. The material may be in loose form or may be tightly packed or baled and may comprise baled straw. The rate that the material will be fed through the feed control 6 will vary depending upon the character of the material and the extent that the tines 33 and 34 protrude through the fingers 49 and 52, respectively. The nearer the fingers are adjusted to the drums 30 and 31, the greater will be the lengths of the tine ends which will project from the convex sides of said fingers and the more will be the material which will be picked up and conveyed by said tines toward the beater 38 and baffle 60. For loose material which is dry and in the form of relatively long strands, the fingers 49 and 52 are adjusted so that only small portions of the tips of the tines 33 and 34 project therebeyond, as material of this character will feed most readily toward the blower 8. Material which is tightly packed or baled, which is wet, and which is in the form of short strands can be fed less readily and the fingers are therefore adjusted nearer the axes of the rotary feeders 36 and 37 to expose greater lengths of the tines beyond the convex sides of said fingers so that desired quantities of the material can be drawn between the rotary feeders 36 and 37 and discharged therefrom toward the beater 38 and baffle 60. The tines 33 and 34 in executing this feeding operation will pull and loosen the individual strands of the mulch material and tend to separate it to a considerable extent. However, tightly packed or baled material which is damp or composed of short strands will tend to be pulled loose by the tine ends and to pass between the rotary feeders 36 and 37 in clumps or bunches. If the material were discharged from the blower 8 in such form, the clumps or bunches when deposited upon the ground would tend to kill the growth covered thereby and an even spreading of the mulch material would not result. In order to insure that none of the material can pass into the blower casing 9 in the form of clumps or bunches, where there is a tendency for the mulch material to pass in this form between the rotary feeders, the baffle 60 is lowered to or adjacent its position of Figure 2 for deflecting all of such material downwardly to thus insure that all such clumps or bunches will come in contact with the tines 35 of the high speed rotary beater 38 by means of which such material will be effectively shredded and broken up so as to pass into the blower casing 9 in a finely divided form, to insure an even discharge of loose mulch material from the casing 9 and an even uniform distribution and spreading of the material on the terrain being covered. Where the material is in dry, loose and finely divided form, the baffle 60 may be supported in a raised position, relative to its position of Figure 2, and so that a part of the material can pass over the beater 38 to minimize shredding of the material which is already loose and finely divided.

It has been found that a more even and uniform feeding of the material is obtainable by making the rotary feeders 36 and 37 of different diameters and by driving said rotary feeders, which rotate in opposite directions, at different speeds. In this manner, the mulch material moves between the rotary feeders 36 and 37 more uniformly as the material carried by the tines of one of the rotary feeders passing between the rotary feeders is ordinarily in advance of or behind material carried by the tines of the other rotary feeder. The rotary beater 38 is provided with a greater number of tines than the rotary feeders, and is revolved at a faster rate than said rotary feeders, so that the tines of the rotary beater 38 can effectively engage and separate all of the mulch material handled by the two feeders 36 and 37.

Various modifications and changes are contemplated and may be resorted to, without departing from the function or scope of the invention as hereinafter defined by the appended claims.

I claim as my invention:

1. In combination with a supply conduit for a mulch material including an outlet end and a blower for discharging the mulch material including a casing having an inlet facing toward and horizontally spaced from said outlet of the supply conduit; a feed control including a casing having an inlet end communicating with the outlet end of the supply conduit and having an outlet end in communication with the blower casing inlet, said casing including spaced substantially parallel side walls, a top wall and a bottom wall, a pair of driven rotary feeders disposed within and extending across said casing and supported and journaled by said side walls including a lower rotary feeder disposed adjacent the casing bottom and an upper rotary feeder disposed between said lower rotary feeder and the top wall of the casing, said rotary feeders being mounted adjacent the casing inlet and each including a plurality of longitudinally and circumferentially spaced outwardly extending tines, a lower feed control member secured to a part of the casing bottom and extending thereacross and having upwardly extending fingers disposed in spaced apart relation to one another transversely of the casing and having curved free end portions disposed partially around the lower feeder and disposed substantially concentric thereto and between said lower feeder and the casing inlet and spaced from the axis of said lower rotary feeder a distance less than the spacing of the outer end portions of said tines from the center of the rotary feeder, an upper feed control member extending across and secured to a portion of the top wall of the casing and having spaced depending curved fingers disposed substantially concentrically around a portion of the upper rotary feeder between said upper feeder and the casing inlet and spaced from the axis thereof a distance less than the spacing between the tips of the tines of the upper feeder and the axis thereof, said upper and lower feed control members having the fingers thereof spaced apart in a manner so that the tines of the rotary feeders can revolve therebetween and will protrude from the convex sides thereof toward the casing inlet whereby the tips of the tines will engage mulch material fed through the casing inlet from the supply conduit for conveying the mulch material between the rotary feeders and toward the feeder casing outlet, said rotary feeders being driven in directions such that the tines thereof in passing between the axes of the two rotary feeders are moving toward the outlet of the feed control casing, and free ends of the curved fingers of the upper and lower feed control members being disposed in spaced apart relation to one another and being located between said rotary feeders.

2. In a feed control as in claim 1, and means for adjustably securing said feed control members to the feeder casing for varying the spacing of the fingers thereof from the rotary feeders for varying the extent that the tines will protrude beyond said fingers toward the casing inlet to vary the amount of material which will be fed through the feeder casing.

3. In a feed control as in claim 1, wherein said rotary feeders are of different over-all diameters and revolve at different R. P. M.

4. In a feed control as in claim 1, a driven beater and separator disposed within said casing and journaled by the side walls thereof and mounted between said lower rotary feeder and the casing outlet, said rotary driven beater revolving in the same direction as said lower rotary feeder and having a plurality of outwardly extending tines for receiving and shredding the material which is conveyed toward the beater from said rotary feeders and for directing the material therefrom toward the casing outlet.

5. In a feed control as in claim 4, and a baffle supported by and depending from said top wall and disposed above said beater for deflecting the material passing through the feeder casing toward the outlet thereof downwardly and toward the beater.

6. In a feed control as in claim 5, and means for angularly adjusting said baffle for varying the angular disposition of the baffle relative to the casing top wall and the spacing between the baffle and beater for varying the extent that the baffle will deflect the material toward the beater.

References Cited in the file of this patent

UNITED STATES PATENTS

| 675,751 | Moustier | June 4, 1901 |
| 1,477,848 | Pardee | Dec. 18, 1923 |
| 1,647,183 | Leggemann | Nov. 1, 1927 |
| 2,171,463 | Tschauner | Aug. 29, 1939 |
| 2,183,583 | Patterson | Dec. 19, 1939 |
| 2,355,358 | Anderson | Aug. 8, 1944 |

FOREIGN PATENTS

| 182,795 | Germany | Mar. 22, 1907 |